United States Patent [19]

Fleckenstein et al.

[11] 3,993,185
[45] Nov. 23, 1976

[54] SANITARY CONVEYOR

[76] Inventors: Robert C. Fleckenstein, 313 N. Garfield St.; Kirit S. Kamdar, 1301 S. Finley St., both of Lombard, Ill. 60148

[22] Filed: Dec. 26, 1974

[21] Appl. No.: 536,341

[52] U.S. Cl. .............................. 198/813; 198/818
[51] Int. Cl.² ....................................... B65G 21/00
[58] Field of Search ........... 198/208, 121, 122, 123, 198/117

[56] References Cited
UNITED STATES PATENTS

| | | | |
|---|---|---|---|
| 2,302,656 | 11/1942 | Dray | 198/208 |
| 2,413,265 | 12/1946 | Thompson | 198/208 |
| 3,456,776 | 7/1969 | Viene | 198/208 |
| 3,695,346 | 10/1972 | Nichols | 198/208 |
| 3,921,793 | 11/1975 | Hutchinson et al. | 198/208 |

FOREIGN PATENTS OR APPLICATIONS

| | | | |
|---|---|---|---|
| 1,033,126 | 6/1958 | Germany | 198/208 |

*Primary Examiner*—Robert J. Spar
*Assistant Examiner*—James M. Slattery

[57] ABSTRACT

A conveyor especially adapted for use in environments where strict sanitary standards must be met. The conveyor includes a quick belt release whereby the belt and the conveyor may be cleaned without removing the belt from the conveyor.

3 Claims, 6 Drawing Figures

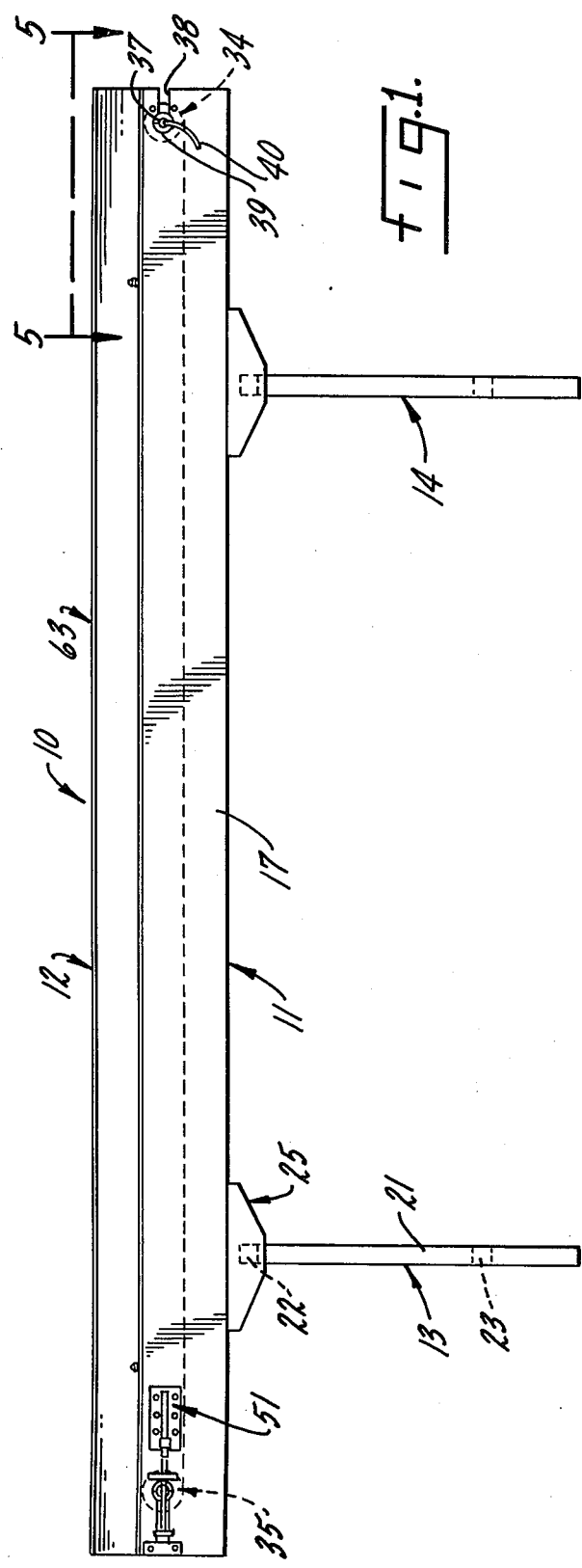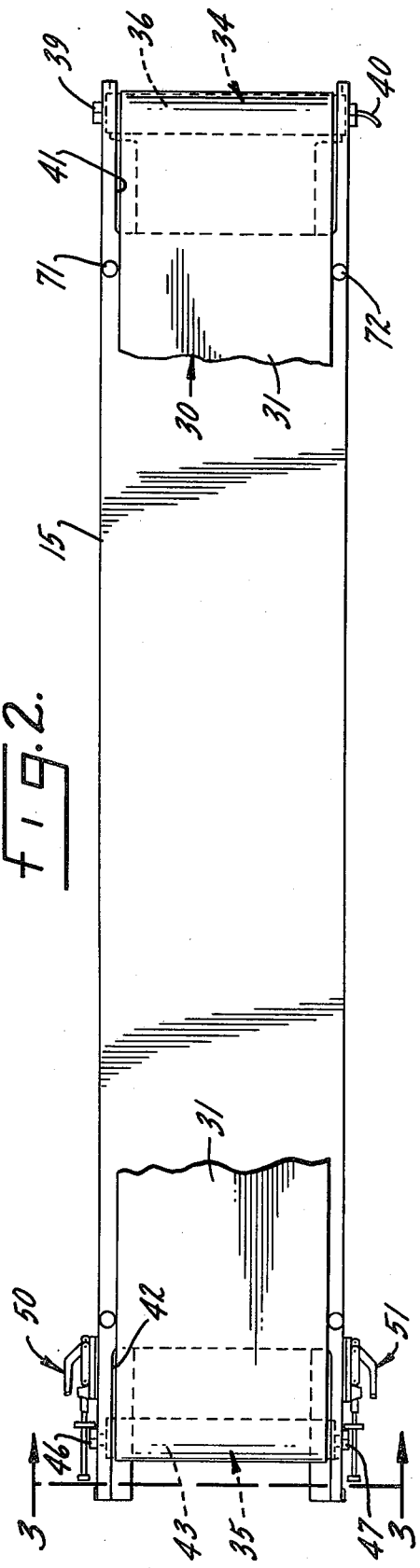

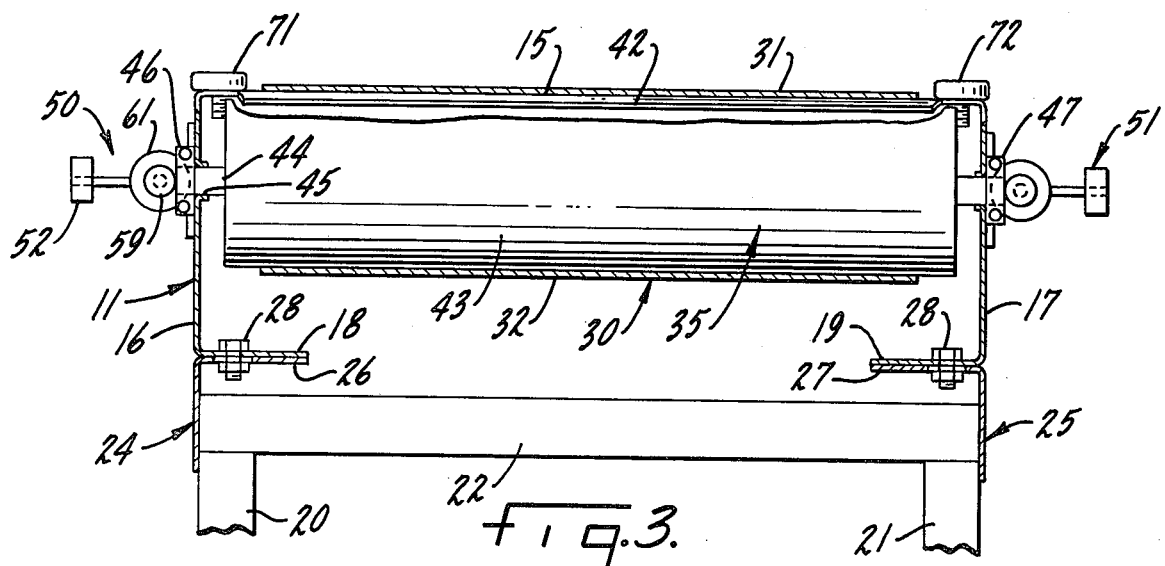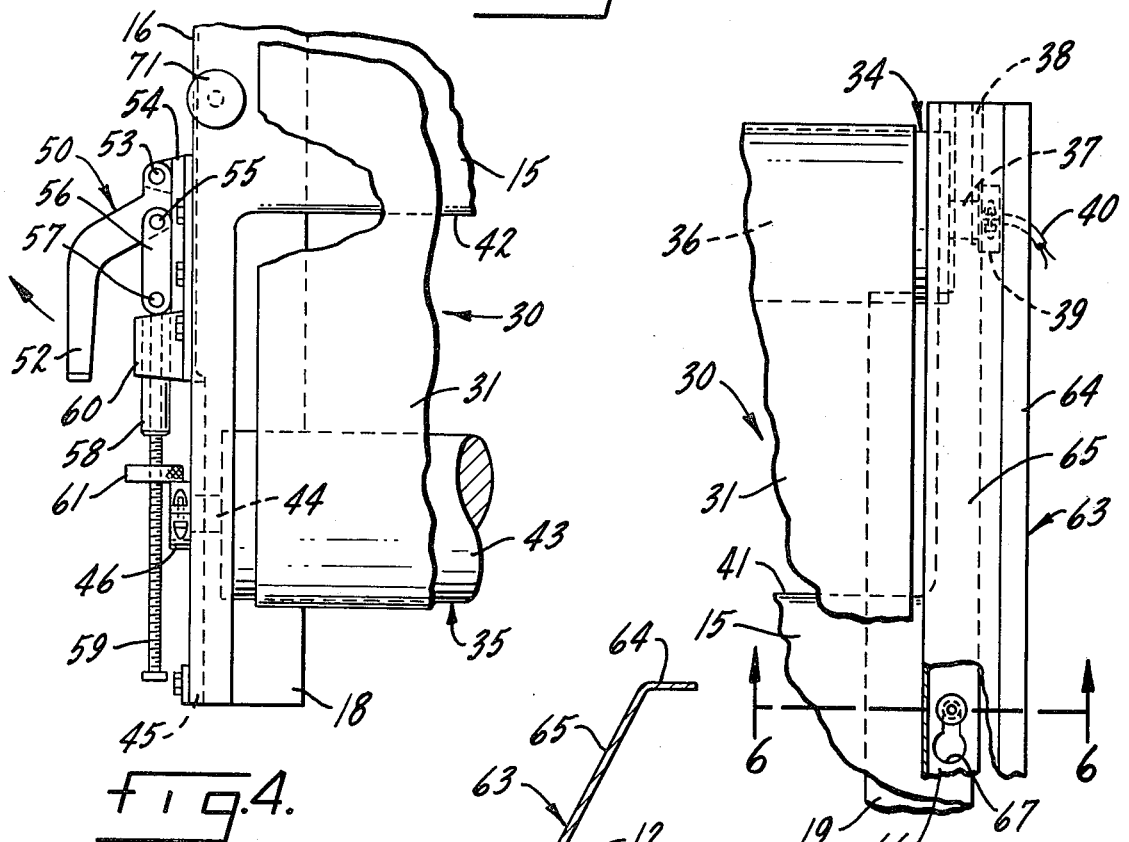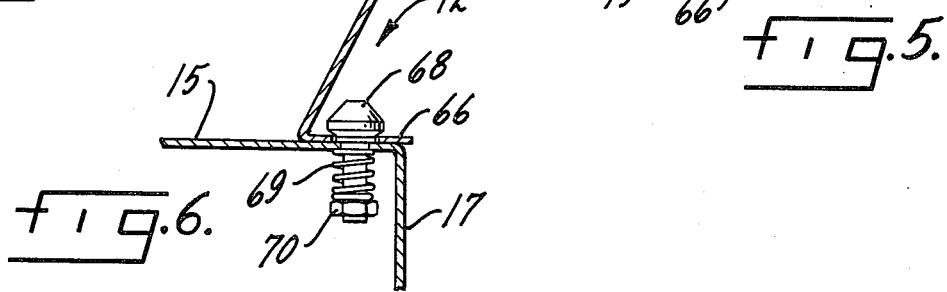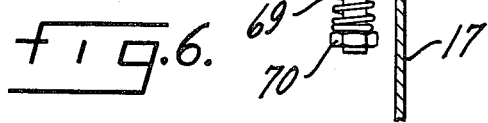

SANITARY CONVEYOR

This invention relates generally to conveyors, and specifically to a conveyor especially adapted for use in applications in which strict sanitary standards must be met, such as the food industry.

The invention includes, in its current preferred form, a flat or cleated conveyor belt which can be horizontally or angularly positioned as required, the belt passing over a smooth, continuous bed, and being powered by an enclosed, motorized drive pulley for which no special shielding precautions during operation and cleaning must be provided. The invention further includes a belt tensioning and slack off feature which enables the conveyor, and both sides of the belt to be cleaned without disassembly or removal of the belt from the conveyor. In addition, all of the above is provided in a structure so arranged as to provide no bacteria gathering crevices, ledges or projections whereby all regulatory agency sanitary standards, including USDA and FDA standards, may be met or exceeded.

The conveyor further includes, as an optional feature, easily assembleable and disassembleable side panels which, when in place, form a trough having smooth, uninterrupted surfaces which form a virtually uninterrupted upward extension of the belt bed.

Accordingly, a primary object of the invention is to provide a sanitary conveyor in which belt tension can be quickly and easily slacked off so that the belt and the conveyor can be cleaned and dried without disassembling the belt, or removing the belt from the conveyor.

Another object is to provide a conveyor as above described in which the mechanism for loosening and tensioning the belt includes a simple flip handle mechanism which imposes or releases tension on the belt by a simple flip of the handle from a first to a second position, but in which slack resulting from gradual loosening of the belt due to normal wear, or a need to increase or decrease tension for any other reason, can be accomplished with a simple threaded collar and bolt arrangement, which is operative throughout the entire range of tension from dead slack to maximum pull.

A further object is to provide a belt conveyor as above described in which the conveyor can be oriented in any position with respect to the horizontal by merely extending or retracting simple adjustable legs, and which can be placed at any desired location since the electrical connection can be run along a tortuous path.

A further object is to provide a conveyor as above described in which the structural frame includes a unitized body composed of one piece of easily bent sheet material which forms both the belt bed and conveyor sides.

Another object is to provide a conveyor as described above which has no bacteria gathering crevices, ledges or projections.

Yet a further object is to provide a conveyor as described above in which a trough configuration can be formed by merely placing a single piece side panel on each side of the conveyor and securing the panels in place by a simple sliding action.

Further objects and advantageous of the invention will be apparent from the following description.

The invention is illustrated more or less diagramatically in the accompanying drawing wherein:

FIG. 1 is a side elevation;

FIG. 2 is a top plan view with parts omitted and others broken away for clarity;

FIG. 3 is a section view to a larger scale taken substantially along the line 3—3 of FIG. 2;

FIG. 4 is a top view of the belt release and tightening mechanism;

FIG. 5 is a partial top plan view taken substantially along the line 5—5 of FIG. 1 to an enlarged scale; and FIG. 6 is a detailed view of the side panel securing mechanism taken substantially along the line 6—6 of FIG. 5 to an enlarged scale.

Like reference numbers will be used to refer to like parts throughout the following description of the Figures.

The conveyor, which is indicated generally at 10 in FIG. 1, includes a main frame structure, indicated generally at 11, side trough means, indicated generally at 12, and conveyor stands indicated generally at 13 and 14.

The main frame structure 11 is best illustrated in FIGS. 1, 2 and 3. The structure includes a bed portion 15 which is preferably planar from edge to edge as best shown in FIGS. 2 and 3. Left and right side panels 16, 17, respectively, extend downwardly from the bed portion 15 and each has an inwardly extending flange or lip portion 18, 19, respectively.

The main frame structure 11 is supported by conveyor stands 13 and 14 of any suitable construction. Preferably an A-frame structure is employed consisting of left and right legs 20 and 21, respectively, and upper and lower cross members 22, 23 respectively. Head plates 24, 25 are welded to the upper outer edges of the stand frame as indicated best in FIGS. 1 and 3. Head plates 24 and 25 each include an inwardly extending lip or flange portion 26, 27 respectively which provide a support surface for the main frame structure, as indicated best in FIG. 3. Connectors, preferably bolts 28, which can be readily assembled and disassembled for shipment, set-up, and relocation secure the main frame structure to the stands. Preferably suitable leveling devices, not shown, are included in the lower end of each stand to enable the main frame structure to be positioned in an exact horizontal plane, or any other plane as desired. Preferably the conveyor stands are made from welded tubular members to provide maximum strength and rigidity.

The conveyor belt is indicated generally at 30, and includes a conveying run 31 and a return run 32. The endless, orbital belt passes around a drive pulley, indicated generally at 34, at its forward or discharge end, and an idler 35 at its tail or receiving end.

Drive pulley 34 consists of a roller 36 which rotates about a stationary shaft 37. Each end of the shaft is received in a slot 38 formed at the forward end of each side panel 16, 17 and is secured to the side panel by any suitable clamping device 46, 47. which can be loosened and tightened to adjustably orient the axis of the shaft and the drive pulley with respect to the main frame structure. If desired, the shaft may have flats formed thereon which are received within the slots 38. A connection to a power source is indicated at 40 in FIG. 5, it being understood that preferably the drive pulley is internally driven by an electric motor which is protected by sealed bearings from the entry of dirt and other foreign substances.

The forward end of main frame structure 11 is cut away, as indicated at 41, to accomodate the drive pulley 36 and to provide easy access to the inner surface of belt 30 for cleaning purposes.

Idler 35 is, in this instance, a conventional idler roller 43 which rotates about a dead shaft 44. Shaft 44 is received in slots 45 formed at the rear end of each of side panels 16 and 17. If desired, shaft 44 may have flats formed thereon at each end which are slidably and relatively snugly received in the slots 45. As illustrated in the drawings the shaft 44 is flatted, and is received in shaft collars 46, 47 secured to the outermost ends thereof, which collars are securely clamped to the shaft to prevent unintended longitudinal movement of the shaft with respect to the main structure.

The rear of main frame structure 11 is cut away as indicated at 42 to accommodate idler 35 and provide access to the under surface of belt 30 for cleaning and inspection.

Means for quickly and simply imposing and relaxing tension on belt 30 is indicated generally at 50 and 51.

Each of the belt tension deivces 50 and 51, which are identical from side to side of the conveyor, include a toggle clamp consisting of a handle 52 which is pivoted, as at 53 to an upstanding ear of a bracket 54 which is secured, as by bolts, to the side panel 16. The handle is pivotally connected as at 57 to a socket housing 58 which in turn is internally threaded to receive an adjustment bolt 59. The socket housing reciprocates in a guide housing 60 carried by the bracket 54.

A threaded collar 61 is received on the threaded adjustment bolt 59, the collar extending outwardly from the bolt sufficiently far to engage and bear against the associated shaft collar 46.

The trough means 12 includes left and right side slide on troughs, only one of which, trough 63, is shown in the drawing. Trough 63 consists essentially of a single piece of bent sheet material having an upper generally horizontally oriented flange portion 64, an inclined side portion 65, and a lower generally horizontally oriented flange portion 66, which includes, in this instance, at least a pair of keyhole shaped slots 67.

Trough 63 is connected to the bed portion 15 of the main frame structure by a spring loaded bolt assembly which includes a tapered head 68 and a spring 69 which is retained on the shank portion of the bolt by nut 70. It will be noted that the underside of tapered head 68 is inwardly tapered to an elevation higher than the thickness of lower flange 66, so that when the trough 63 is slid longitudinally on bed 15 and the edge of the keyhole slot strikes the underside of the tapered head, the taper will permit upward movement of the bolt, with consequent depression of spring 69.

If troughs are not employed, which is the condition illustrated in FIG. 2, the holes in bed portion 15 which are intended to receive the bolts 68 may be plugged by simple bolts 71, 72 which act as abutment or guide means for the edge of the conveyor belt 30. Preferably the plug bolts are made of Teflon or other relatively soft plastic material to ensure minimal wear on the edge of the belt.

The use and operation of the invention is as follows.

To assemble the conveyor the user merely places the main frame structure 15 on the individual stands 13 and bolts the frame structure to the stand with bolts 28. Leveling devices carried by the stands ensure positioning of the bed portion 15 of the stand at any desired orientation, which may be horizontal or inclined in the event the head plates 24, 25 of the conveyor stands are inclined with respect to the horizontal.

The drive pulley 36 is then slipped into the slots at the forward end of the main frame structure, the idler 35 slipped into the slots at the rear end portion of the main frame structure, and the conveyor belt trained around the drive pulley and idler.

Tension adjustment of the belt is regulated by the position of threaded collar 61 on adjustment bolt 59. By merely turning the threaded collar in a direction to move it toward the tail end of the conveyor, pressure is exerted against shaft collars 46, 47 and hence on the shaft of idler 35, thereby increasing tension on the belt. When tension on the belt must be relaxed for inspection or cleaning, the handles 52 in each of belt tensioning mechanisms 50, 51 are flipped in the direction of the arrow in FIG. 4, which movement causes a retraction of adjustment bolt 59 by virtue of the toggle link mechanism illustrated best in FIG. 4.

For cleaning purposes the underside of the belt and the upper surface of the bed portion may be merely hosed down, and the belt propped up in a position out of contact with the bed to dry, all of the aforegoing being accomplished without removal of the belt from the structure.

When it is desired to commence operation, handles 52 are merely flipped back to the illustrated position in FIGS. 2 and 4, thereby placing tension on the belt preparatory to actuating the drive motor in drive pulley 36. The identical tension is replaced on the belt, all of the foregoing occurring without use of tools.

Gradual wear or stretch in the belt is accommodated, either when tension is on or off the belt, by slight adjustments of threaded collar 61.

Preferably the entire assembly is formed from stainless steel to provide maximum resistance against corrosive materials.

It will also be noted that the main frame structure 15 is of a unitized construction in the sense that it is a continuous piece in which the various components are not connected to one another by mechanical linkage means. In this instance the bed portion 15 and the left and right side panels 16 and 17 have been formed from a single sheet of material; however, it will be understood that if for any reason welding appears more advantageous, the structure may be so fabricated, but the illustrated single piece construction is preferred. In addition to functioning as a slider bed for the belt, the main frame structure acts as a support for the return run of the belt, and acts as a housing for the drive pulley and idler.

It will be further noted that the construction is such that there are no crevices, ledges or projection anywhere on the conveyor which provide gathering places for bacteria or other unsanitary residues. Further, because there are no external motors, gears, chains or sprockets, and since the drive pulley is totally sealed and housed within the main frame structure, the conveyor provides near optimum operator safely. It also has a lower noise level than conventional conveyors.

Though a preferred embodiment of the invention has been illustrated and described, it will at once be apparent to those skilled in the art that various modifications may be made within the spirit and scope of the invention. Accordingly it is intended that the scope of the invention be limited solely by the scope of the hereinafter apended claims when interpreted in light of the pertinent prior art rather than by the foregoing exemplary description.

We claim:

1. A unitary, one piece frame sanitary conveyor, said sanitary conveyor including, in combination,
   a one piece frame, said frame having
   a horizontal belt bed,
   said belt bed having a smooth, continuous upper surface for supporting a tensioned conveyor belt which slides thereover,
   a side member formed integrally with, and depending downwardly from, each edge portion of the belt bed member,
   said belt bed member and downwardly depending side members being formed as a single part having a smooth, continuous surface,
   an idler assembly having a central supporting shaft, the end portions of which project outwardly from each end of the idler assembly,
   a pair of shaft receiving slots disposed opposite one another in the side members at a tail end portion of the conveyor,
   said end portions which project outwardly from the central supporting shaft of the idler assembly being received in said oppositely disposed slots,
   whereby the idler assembly is directly attached to and supported only by the one piece frame,
   a drive pulley assembly having a central supporting shaft, the end portions of which shaft project outwardly from each end of the drive pulley assembly,
   a pair of drive pulley assembly shaft receiving slots disposed opposite one another in the side members at a head end portion of the conveyor,
   said central supporting shaft end portions being received in said oppositely disposed drive pulley assembly shaft receiving slots,
   whereby the drive pulley assembly is directly attached to and supported only by the one piece frame,
   the pair of oppositely disposed slots associated with one of the aforesaid assemblies being elongated in a longitudinal direction which opens at the end of the conveyor bed,
   to thereby provide relative movement of the assemblies toward and away from one another along a unidirectional, linear path, and
   manually operable belt tensioning means associated with one of said assemblies for relatively moving said assemblies
   away from one another whereby tension is applied to an endless conveyor belt entrained around said assemblies, and
   toward one another in a belt tension releasing direction which is parallel to the direction of movement of the conveyor belt, and within the confines of the slots,
   whereby a belt entrained about the conveyor belt bed and said assemblies can be lifted out of contact with the conveyor structure for cleaning without concomitant movement of conveyor components in a direction having a vertical component of movement.

2. The unitary, one piece frame sanitary conveyor of claim 1 further characterized in that
   said manually operable belt tensioning means including
   horizontally reciprocable non-spring loaded tension application means which is moveable from
   a first position in which said tension means is out of contact with the assembly with which it is associated whereby the assemblies may be moved relatively toward one another and tension on the belt relaxed, to a
   second position in which the assemblies are moved relatively away from one another so as to impose tension on the belt.

3. The unitary, one piece frame sanitary conveyor of claim 1 further including
   an attachable and removeable trough side member at each edge portion of the belt bed member,
   the lowest portion of each side trough member resting in abutting relationship on the upper surface of the edge of the belt bed member to thereby form a generally U-shaped trough having no gaps therein,
   spring loaded connection means disposed outside the internal, comestible contacting surface of the trough for connecting each trough side member to the bed member,
   said connecting means positively precluding separation of the trough side members from the bed member in a direction perpendicular to the upper surface of the bed member.

* * * * *